United States Patent
Erlick et al.

(10) Patent No.: US 12,533,148 B2
(45) Date of Patent: Jan. 27, 2026

(54) APPARATUS AND METHOD FOR TREATMENT OF POST THROMBOTIC SYNDROME

(71) Applicant: Bard Peripheral Vascular, Inc., Franklin Lakes, NJ (US)

(72) Inventors: Benjamin Erlick, Scottsdale, AZ (US); Matthew Gerveler, Tempe, AZ (US); Michael Lewis, Mesa, AZ (US); Claire Millar, Phoenix, AZ (US); Ranjani Sampath Kumaran, Tempe, AZ (US); Brandon Simmons, Tempe, AZ (US); Alexander Tessmer, Phoenix, AZ (US); Michael Tristan, Maricopa, AZ (US); David Tze, Phoenix, AZ (US)

(73) Assignee: BARD PERIPHERAL VASCULAR, INC., Franklin Lakes, NJ (US)

( * ) Notice: Subject to any disclaimer, the term of this patent is extended or adjusted under 35 U.S.C. 154(b) by 1273 days.

(21) Appl. No.: 16/928,678

(22) Filed: Jul. 14, 2020

(65) Prior Publication Data
US 2022/0015784 A1 Jan. 20, 2022

(51) Int. Cl.
*A61B 17/22* (2006.01)
*A61B 17/221* (2006.01)
(Continued)

(52) U.S. Cl.
CPC ...... *A61B 17/221* (2013.01); *A61B 17/22032* (2013.01); *A61B 90/37* (2016.02);
(Continued)

(58) Field of Classification Search
CPC ............ A61B 17/221; A61B 17/22031; A61B 17/22032; A61B 17/22034;
(Continued)

(56) References Cited

U.S. PATENT DOCUMENTS

| | | |
|---|---|---|
| 4,883,460 A | 11/1989 | Zanetti |
| 6,454,775 B1 | 9/2002 | Demarais et al. |
| 6,485,501 B1 * | 11/2002 | Green ................ A61F 2/013 |
| | | 606/200 |
| 6,500,186 B2 | 12/2002 | Lafontaine et al. |

(Continued)

FOREIGN PATENT DOCUMENTS

| | | | |
|---|---|---|---|
| CN | 104068910 | * 10/2014 | |
| WO | WO-2005094283 A2 | * 10/2005 | ....... A61B 17/22012 |

OTHER PUBLICATIONS

Merriam-Webster Definition (Year: 2009).*

*Primary Examiner* — Tan-Uyen T Ho
*Assistant Examiner* — Lindsey R. Rivers
(74) *Attorney, Agent, or Firm* — DINSMORE & SHOHL LLP

(57) ABSTRACT

A medical apparatus has a thrombectomy device disposed in a sheath lumen of a sheath that is movable between an initial extended position and a retracted position. The thrombectomy device includes a first elongate cannula having a distal tip, a guidewire lumen, and a perforated region, which is proximal to the distal tip and is in fluid communication with the guidewire lumen. A second elongate cannula, which is configured to rotate, has a second lumen and a mechanical thrombectomy whisk, which is proximal to the distal tip. A third elongate cannula has a third exterior surface, a third lumen, an inflation passageway, an inflatable balloon connected to the third exterior surface, and an expandable embolic filter connected to the third exterior surface at a location distal to the inflatable balloon. The first elongate cannula is disposed in the second lumen. The second elongate cannula is disposed in the third lumen.

12 Claims, 13 Drawing Sheets

(51) Int. Cl.
*A61B 90/00* (2016.01)
*A61F 2/01* (2006.01)
*A61B 17/3207* (2006.01)

(52) U.S. Cl.
CPC .............. *A61B 90/39* (2016.02); *A61F 2/013* (2013.01); *A61B 2017/22038* (2013.01); *A61B 2017/22079* (2013.01); *A61B 2090/3966* (2016.02)

(58) Field of Classification Search
CPC ........... A61B 2017/22038; A61B 2017/22051; A61B 2017/22079; A61B 2217/007; A61F 2/013
See application file for complete search history.

(56) References Cited

U.S. PATENT DOCUMENTS

| | | |
|---|---|---|
| 6,808,531 B2 | 10/2004 | Lafontaine et al. |
| 7,931,659 B2 | 4/2011 | Bose et al. |
| 9,308,007 B2 | 4/2016 | Cully et al. |
| 9,364,255 B2 * | 6/2016 | Weber ............ A61B 17/320725 |
| 9,439,664 B2 | 9/2016 | Sos |
| 9,820,769 B2 | 11/2017 | Krolik et al. |
| 9,833,599 B2 | 12/2017 | Krolik et al. |
| 2012/0046599 A1 | 2/2012 | Schoenle et al. |
| 2016/0022293 A1 * | 1/2016 | Dubrul ................... A61B 17/11 606/194 |
| 2016/0095619 A1 | 4/2016 | Mcmahon et al. |
| 2016/0242790 A1 | 8/2016 | Brandeis |
| 2016/0278805 A1 | 9/2016 | Hatta et al. |
| 2017/0020556 A1 * | 1/2017 | Sutton .............. A61B 17/12109 |
| 2017/0224375 A1 | 8/2017 | Robertson et al. |

* cited by examiner

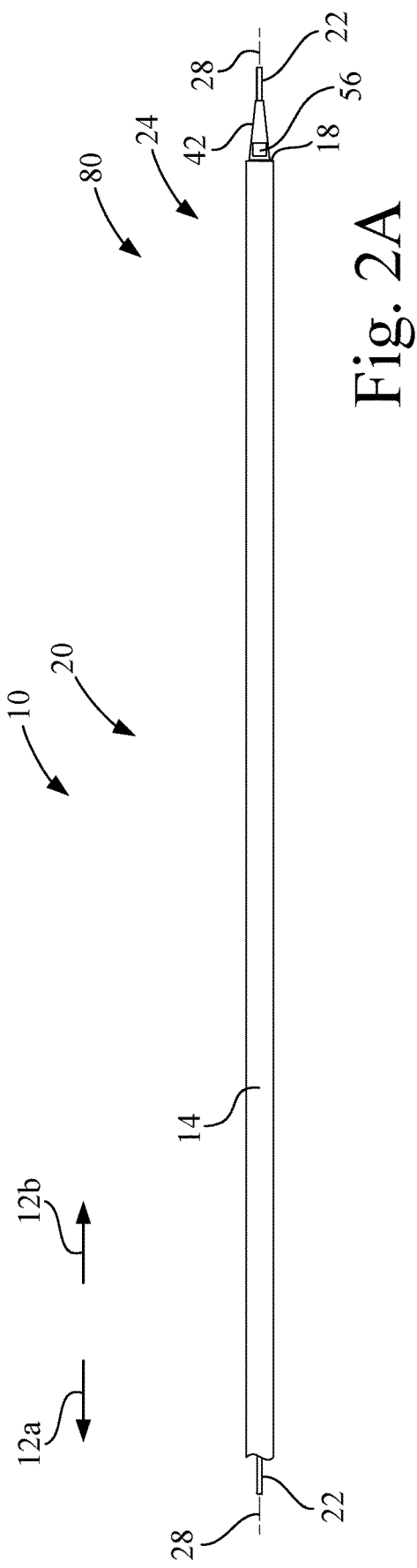
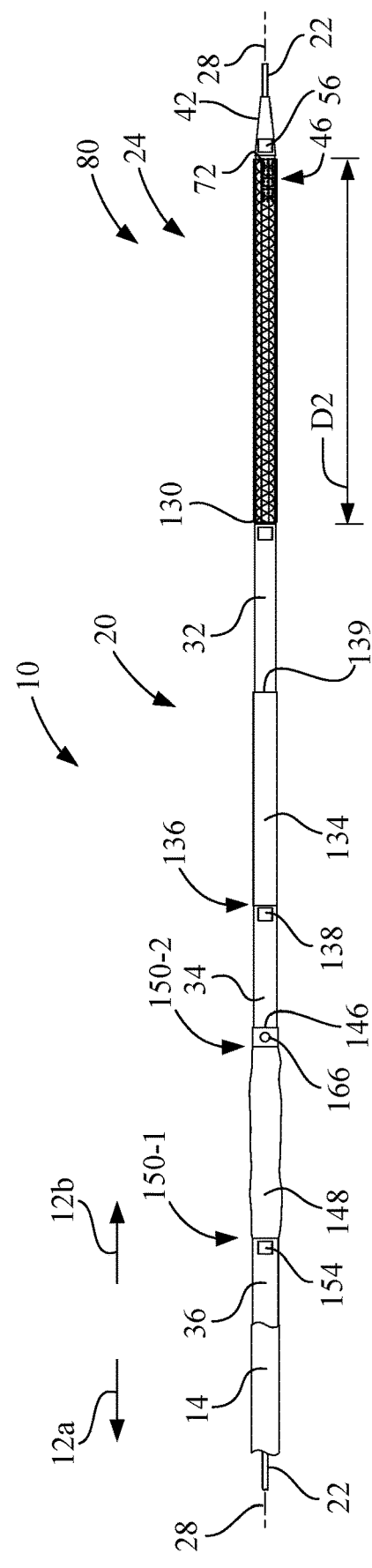
Fig. 2A
Fig. 2B

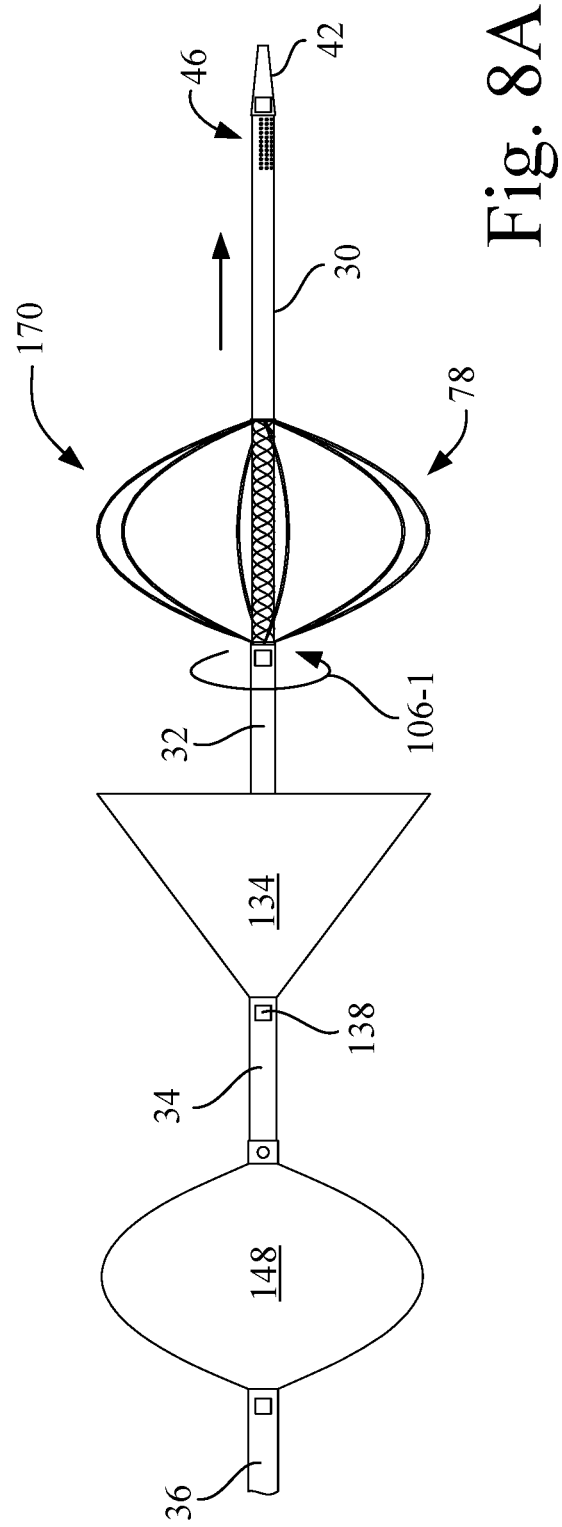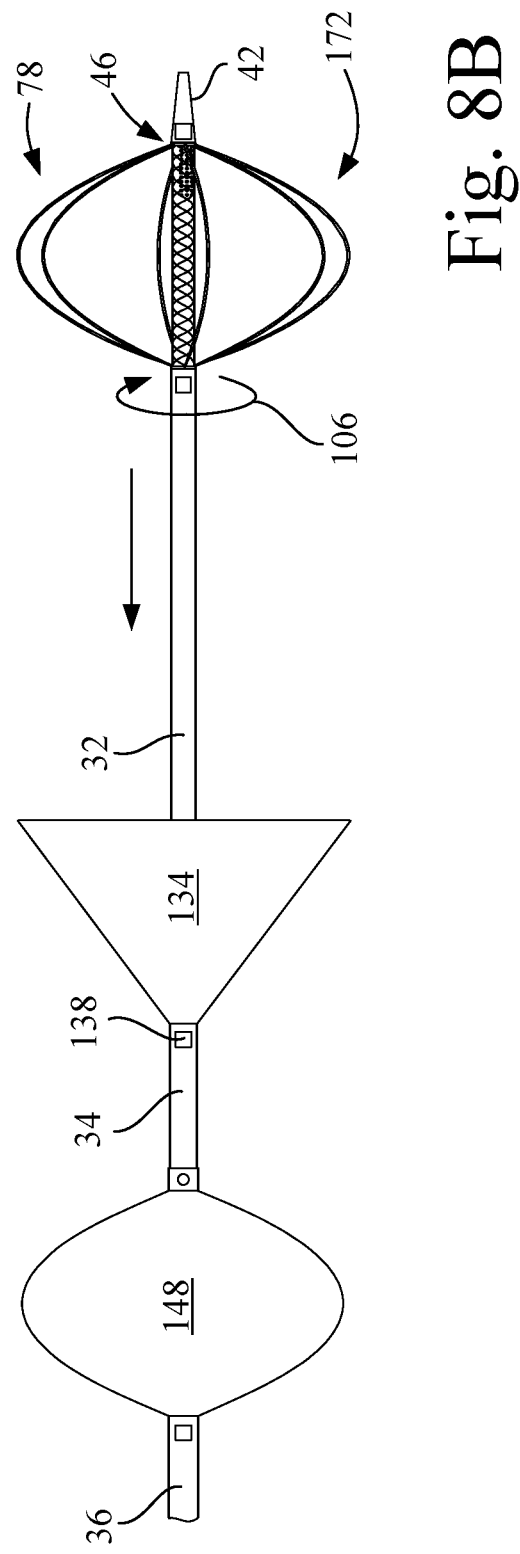

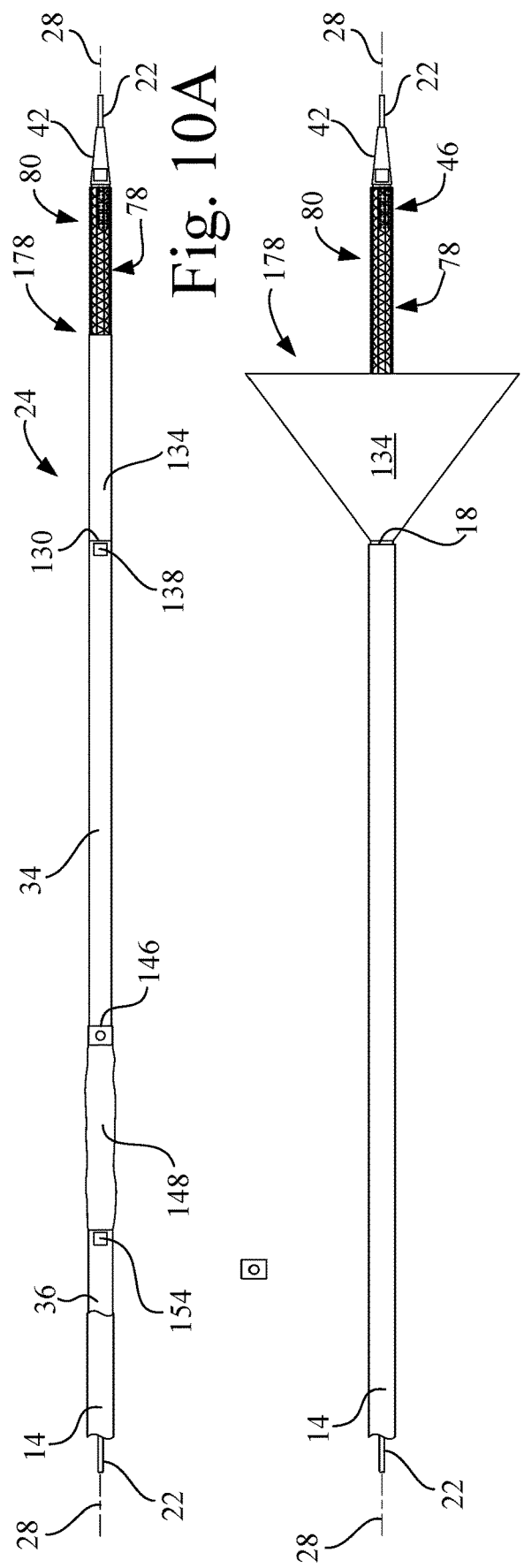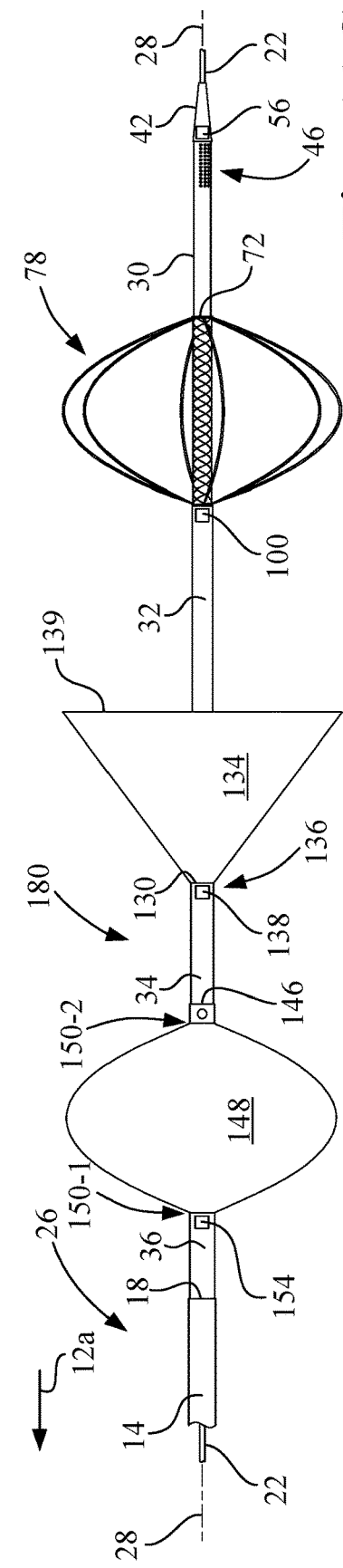

APPARATUS AND METHOD FOR TREATMENT OF POST THROMBOTIC SYNDROME

CROSS-REFERENCE TO RELATED APPLICATIONS

None.

TECHNICAL FIELD

The present invention relates generally to an apparatus and method for the treatment of post thrombotic syndrome, and, more particularly, the technology relates to a single medical apparatus for providing mechanical thrombectomy, lytic delivery, and embolic protection.

BACKGROUND ART

Currently, physicians must pull multiple devices off the shelf during a single procedure to provide mechanical thrombectomy, lytic infusion, and aspiration during the treatment of post thrombotic syndrome. The use of multiple devices during a single procedure requires additional costs associated with the additional devices and additional procedure time. Furthermore, the use of multiple devices during a procedure increases additional risk to the patient related to the multiple insertions and prolonged procedure time.

What is needed, therefore, is a single device that would provide physicians with the ability to treat a patient, having any form of thrombus, without having to remove and insert a new device to shorten the procedure, lower costs, and potentially lower the risk to the patient.

SUMMARY OF INVENTION

The present invention provides a medical apparatus for the treatment of post thrombotic syndrome. The medical apparatus has a sheath and a thrombectomy device. The sheath has a sheath distal end and a sheath lumen. The sheath is movable between an initial extended sheath position and a retracted sheath position. The thrombectomy device is disposed in the sheath lumen.

The thrombectomy device includes a first elongate cannula, a second elongate cannula, a third elongate cannula, and a fourth elongate cannula. The first elongate cannula has a proximal end, a distal end having a distal tip, a guidewire lumen, and a perforated region. The perforated region has a plurality of perforations in fluid communication with the guidewire lumen. The perforated region is proximal to the distal tip.

The second elongate cannula has a second proximal end, a second distal end, a second lumen, and a mechanical thrombectomy whisk. The first elongate cannula is disposed in the second lumen. The mechanical thrombectomy whisk is proximal to the distal tip. The second elongate cannula is configured to rotate.

The third elongate cannula has a third exterior surface, a third proximal end, a third distal end, a third lumen, and an expandable embolic filter connected to the third exterior surface. The second elongate cannula is disposed in the third lumen.

The fourth elongate cannula has a fourth exterior surface, a fourth proximal end, a fourth distal end, a fourth lumen, an inflation passageway, and an inflatable balloon connected to the fourth exterior surface. The third elongate cannula is disposed in the fourth lumen. The inflatable balloon is in fluid communication with the inflation passageway.

The invention in one form is directed to a medical apparatus having a sheath and a thrombectomy device. The sheath has a sheath lumen. The sheath is movable between an initial extended sheath position and a retracted sheath position. The thrombectomy device is disposed in the sheath lumen. The thrombectomy device includes a first elongate cannula, a second elongate cannula, and a third elongate cannula.

The first elongate cannula has a proximal end, a distal end having a distal tip, a guidewire lumen, and a perforated region. The perforated region has a plurality of perforations in fluid communication with the guidewire lumen. The perforated region is proximal to the distal tip.

The second elongate cannula has a second proximal end, a second distal end, a second lumen, and a mechanical thrombectomy whisk. The first elongate cannula is disposed in the second lumen. The mechanical thrombectomy whisk is proximal to the distal tip. The second elongate cannula is configured to rotate.

The third elongate cannula has a third exterior surface, a third proximal end, a third distal end, a third lumen, an inflation passageway, an inflatable balloon connected to the third exterior surface, and an expandable embolic filter. The expandable embolic filter is connected to the third exterior surface at a location distal to the inflatable balloon. The second elongate cannula is disposed in the third lumen. The inflatable balloon is in fluid communication with the inflation passageway.

The invention in another form is directed to a method for treatment of a thrombus. The method includes: inserting a guidewire into a venous lumen having a thrombus at a treatment site, the venous lumen having a venous lumen diameter; and introducing a medical apparatus over the guidewire.

The medical apparatus includes a sheath having a sheath lumen and a thrombectomy device disposed in the sheath lumen. The sheath is movable between an initial extended sheath position and a retracted sheath position.

The thrombectomy device includes a first elongate cannula, a second elongate cannula, and a third elongate cannula. The first elongate cannula has a proximal end, a distal end having a distal tip, a guidewire lumen, a perforated region, and a first marker on the distal tip. The perforated region has a plurality of perforations in fluid communication with the guidewire lumen. The perforated region is proximal to the distal tip. The second elongate cannula has a second proximal end, a second distal end, a second lumen, and a mechanical thrombectomy whisk. The first elongate cannula is disposed in the second lumen. The mechanical thrombectomy whisk is proximal to the distal tip. The second elongate cannula is configured to rotate. The third elongate cannula has a third exterior surface, a third proximal end, a third distal end, a third lumen, an inflation passageway, an inflatable balloon connected to the third exterior surface, and an expandable embolic filter connected to the third exterior surface at a location distal to the inflatable balloon. The second elongate cannula is disposed in the third lumen. The inflatable balloon is in fluid communication with the inflation passageway.

Furthermore, the method includes: tracking the first marker to the treatment site via angiography; advancing the medical apparatus over the guidewire until the first marker has passed the thrombus in the venous lumen; retracting the sheath to the retracted sheath position to expose the thrombectomy device, whereby the expandable embolic filter automatically expands as the sheath retracts; inflating the inflatable balloon through the inflation passageway; confirming via angiography that a blood flow in the venous lumen has stopped at the treatment site; stopping inflation of the inflatable balloon upon confirmation that the blood flow has stopped at the treatment site; expanding the mechanical thrombectomy whisk to the venous lumen diameter; delivering a lytic solution through the first elongate cannula; rotating the second elongate cannula having the mechanical thrombectomy whisk, whereby the step of delivering the lytic solution and the step of rotating break up the thrombus into debris at the treatment site in the venous lumen; deflating the inflatable balloon, whereby the step of deflating restores blood flow and pushes the debris into the expandable embolic filter; extending the sheath to the initial extended sheath position over the thrombectomy device; retracting the medical apparatus from the venous lumen; and retracting the guidewire from the venous lumen.

BRIEF DESCRIPTION OF DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is a side view of the medical apparatus of FIG. 1A, according to an aspect of the invention, showing the sheath in the initial extended sheath position;

FIG. 2B is a partial side view of the medical apparatus of FIG. 2A with the sheath cut away to show the thrombectomy device in a collapsed initial state;

FIG. 8A is a side view of the medical apparatus of FIG. 1A, according to an aspect of the present invention, the second elongate cannula is in the initial second elongate cannula retracted position;

FIG. 8B is a side view of the medical apparatus of FIG. 1A, according to an aspect of the present invention, the second elongate cannula is in the distal-most second elongate cannula extended position;

FIG. 10A is a partial side view of the medical apparatus of FIG. 1A, according to an aspect of the present invention, the third elongate cannula is in the initial third elongate cannula extended position and the sheath is in the initial extended sheath position;

FIG. 10B is a side view of the medical apparatus of FIG. 1A, according to an aspect of the present invention, the third elongate cannula is in the initial third elongate cannula extended position and the sheath is in a partially retracted position;

FIG. 10C is a side view of the medical apparatus of FIG. 1A, according to an aspect of the present invention, the third elongate cannula is in the third elongate cannula retracted position and sheath is in the retracted sheath position.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1A:
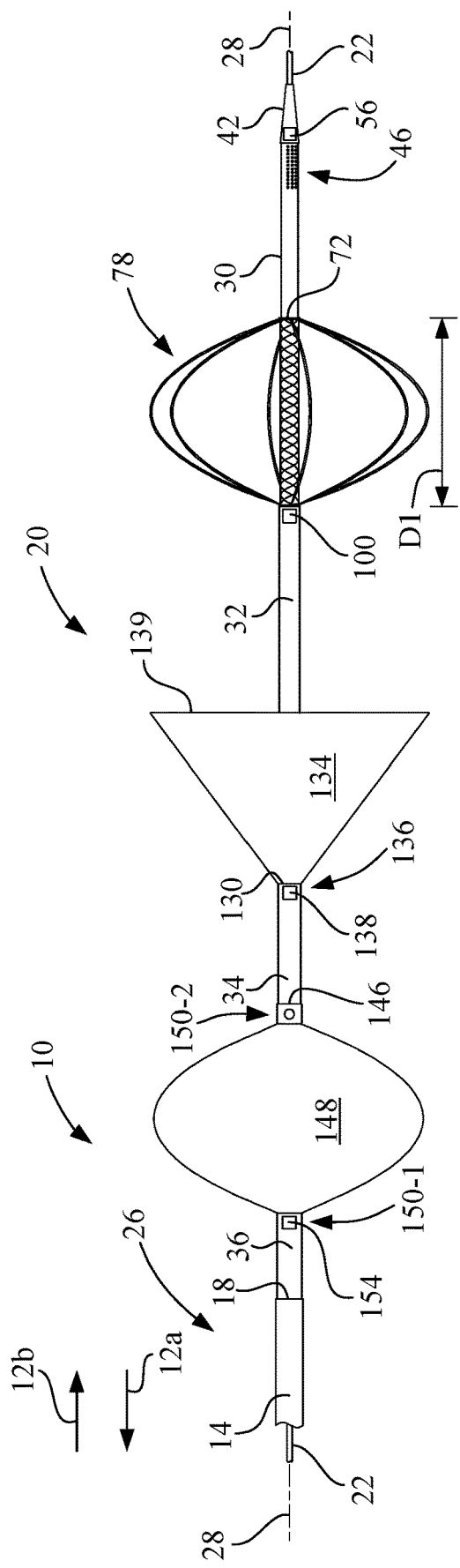
FIG. 1A is a side view of a medical apparatus, according to an aspect of the invention, showing the sheath in a retracted sheath position.

Referring now to the drawings, and more particularly to FIG. 1A, there is shown a medical apparatus 10 for treating any form of thrombus, including treating post thrombotic syndrome. FIG. 1A includes a proximal direction 12a and a distal direction 12b. The medical apparatus generally includes a sheath 14, which has a sheath lumen 16 and a sheath distal end 18, and a thrombectomy device 20. Thrombectomy device 20 is disposed in the sheath lumen 16, so that thrombectomy device 20 is protected as medical apparatus 10 slides over a guidewire 22. As shown in FIG. 1A and FIGS. 2A-2B, medical apparatus 10 extends along a longitudinal axis 28.

Sheath 14 is movable between an initial extended sheath position 24, e.g., the position shown in FIGS. 2A-2B, and a retracted sheath position 26, e.g., the position shown in FIG. 1A, to expose thrombectomy device 20. Sheath 14 may be constructed of thermoplastic, e.g., PEBAX® or a metal alloy, e.g., stainless steel or nitinol.

Thrombectomy device 20 has a first elongate cannula 30, a second elongate cannula 32, a third elongate cannula 34, and a fourth elongate cannula 36. In the initial extended sheath position 24 depicted in both FIGS. 2A and 2B, sheath 14 entirely covers the second elongate cannula 32, third elongate cannula 34, and fourth elongate cannula 36. According to other aspects of the invention, sheath 14 entirely covers first elongate cannula 30, second elongate cannula 32, third elongate cannula 34, and fourth elongate cannula 36 when the sheath 14 is in the initial extended sheath position 24.

Figure 3A:
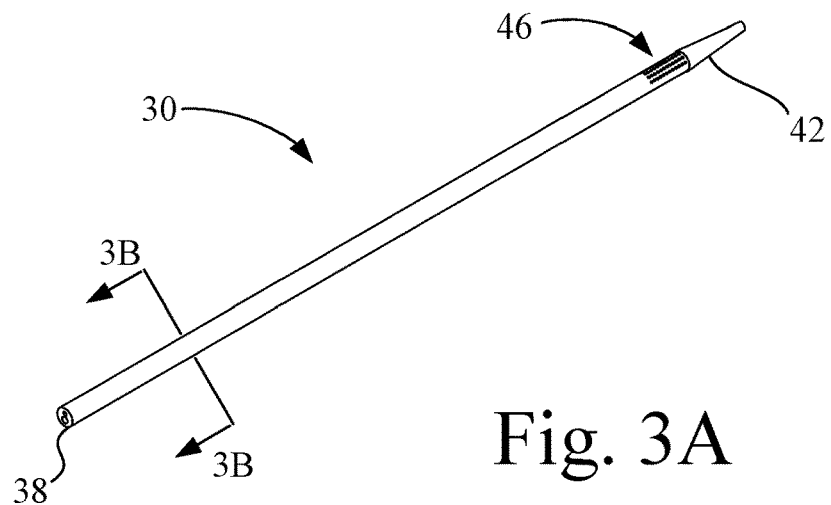
FIG. 3A is a perspective view of an exemplary first elongate cannula.

As shown in FIG. 3A, the first elongate cannula 30 has a proximal end 38, a distal end 40 having a distal tip 42, a guidewire lumen 44, and a perforated region 46 made up of a plurality of perforations 48. As shown in FIGS. 3A and 3C, perforated region 46 is proximal to distal tip 42. Although not shown in FIG. 3A, perforated region 46 may extend all the way around the central axis of first elongate cannula 30.

Distal tip 42 is shaped substantially like a cone. Distal tip 42 includes a distal tip proximal end 50 and a distal tip distal end 52. Distal tip 42 further includes a distal tip guidewire lumen 54 that is centrally located along the longitudinal axis 28 in the distal tip 42 and is communicatively coupled to the guidewire lumen 44 of first elongate cannula 30.

First elongate cannula 30 may be constructed of thermoplastic, e.g., PEBAX® or a metal alloy, e.g., stainless steel or nitinol. Distal tip 42 may be integral to first elongate cannula 30, where both distal tip 42 and first elongate cannula 30 are manufactured of the same material. When the sheath 14 is in the initial extended sheath position 24, sheath 14 may be configured to expose or cover distal tip 42. Alternatively, distal tip 42 may be separately manufactured of a material that is different from the material used to make first elongate cannula 30, in which case distal tip 42 is affixed to the distal end 40 of first elongate cannula 30. According to this aspect of the invention, sheath 14 entirely covers first elongate cannula 30 when the sheath 14 is in the initial extended sheath position 24. Distal tip 42 may be made of radiopaque material for tracking the distal tip via external imaging, such as, e.g., X-ray during the medical procedure, or distal tip 42 may include a first marker 56, which is a radiopaque element.

Figure 3B:
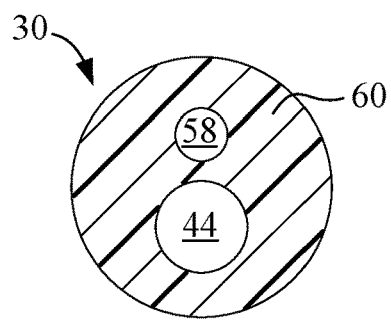
FIG. 3B is a cross-sectional view of the first elongate cannula taken along cross-sectional line 3B in FIG. 3A at a transverse angle across longitudinal axis, where the first elongate cannula is not assembled with the other components of medical apparatus.
Figure 3C:
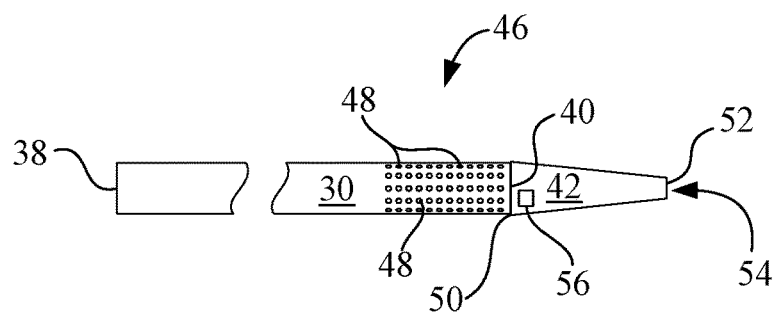
FIG. 3C is an enlarged side view of the first elongate cannula.

FIG. 3B shows a cross-section view of an embodiment of the first elongate cannula 30 taken across the longitudinal axis 28 at cross-section line 3B in FIG. 3A. Both FIG. 3B and FIG. 3C show first elongate cannula 30 in the unassembled condition. FIG. 3B is enlarged and not to scale with respect to FIG. 3A or the actual medical apparatus 10. First elongate cannula 30 includes at least one lumen, i.e., the guidewire lumen 44, and, optionally, a lytic lumen 58, as well.

When no lytic lumen 58 is included in first elongate cannula 30, the perforated region 46 has a plurality of perforations 48 that is in fluid communication with the guidewire lumen 44. Moreover, first elongate cannula has a first sidewall 60 and the plurality of perforations 48 extend entirely through first sidewall 60 to the guidewire lumen 44. Guidewire lumen 44 is configured for receiving the guidewire therethrough to guide medical apparatus 10 over the guidewire 22 into a patient and to a treatment site in a venous lumen, and guidewire lumen 44 is configured for delivering a therapeutic solution, such as, e.g., a lytic solution, thrombolytic solution, or a thrombolytic agent, from the proximal end 38 of first elongate cannula 30 to perforated region 46 and through the plurality of perforations 48 to a treatment site 104 to break down and destroy a thrombus 108 in a venous lumen 110.

Alternatively, in the instances that first elongate cannula 30 includes a lytic lumen 58 in addition to guidewire lumen 44, as shown in FIG. 3B, the plurality of perforations 48 is in fluid communication with lytic lumen 58 and the plurality of perforations 48 extend entirely through first sidewall 60 to lytic lumen 58. Also, when first elongate cannula 30 includes lytic lumen 58 in addition to guidewire lumen 44, the guidewire lumen 44 is configured for receiving guidewire 22 therethrough to guide medical apparatus 10 over the guidewire 22 into a patient and to treatment site 104 in a venous lumen 110, and the lytic lumen 58 is configured for delivering the therapeutic solution, such as, e.g., a lytic solution, thrombolytic solution, or a thrombolytic agent, from the proximal end 38 of first elongate cannula 30 to the perforated region 46 and through the plurality of perforations 48 to venous lumen 110.

Figure 4A:
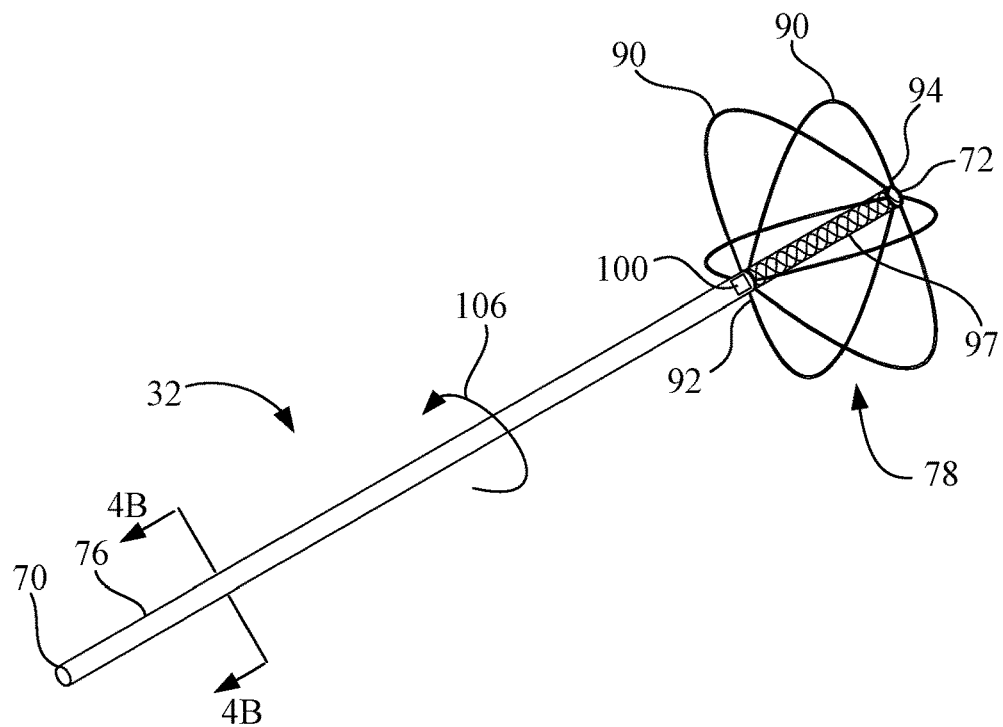
FIG. 4A is a perspective view of the second elongate cannula; where the second elongate cannula is not assembled with the other components of medical apparatus.
Figure 4B:
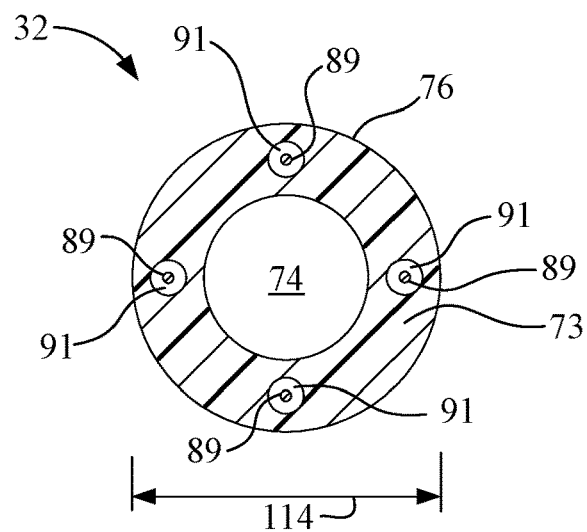
FIG. 4B is a cross-sectional view of the second elongate cannula, taken along cross-sectional line 4B in FIG. 4A at a transverse angle across the longitudinal axis, where the second elongate cannula is not assembled with the other components of medical apparatus.

As shown in FIGS. 4A-4E, second elongate cannula 32 has a second proximal end 70, a second distal end 72, a second sidewall 73, a second lumen 74, a second exterior surface 76, and a mechanical thrombectomy whisk 78. FIG. 4A shows second elongate cannula 32 in a perspective view and unassembled with the other components of medical apparatus 10. FIG. 4B is enlarged and not to scale with respect to FIG. 4A or the actual medical apparatus 10. Second elongate cannula 32 is configured to move rotationally, as indicated by rotational direction 106. Second lumen 74 is centrally located along longitudinal axis 28 and is configured for first elongate cannula 30 to fit within second lumen 74.

Figure 4C:
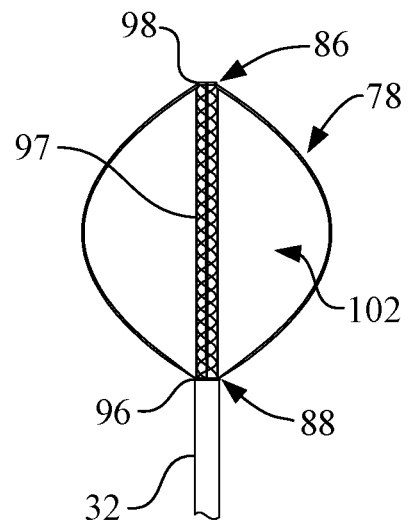
FIG. 4C is a side view of the second elongate cannula.
Figure 4E:
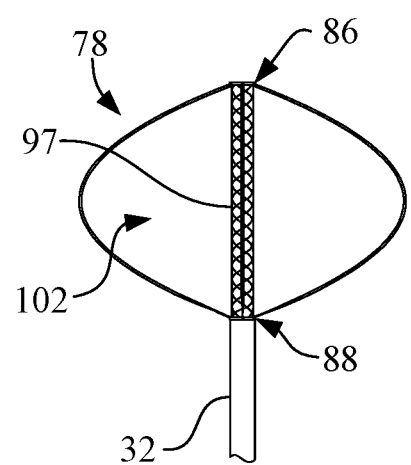
FIG. 4E is a side view of the second elongate cannula.
Figure 4D:
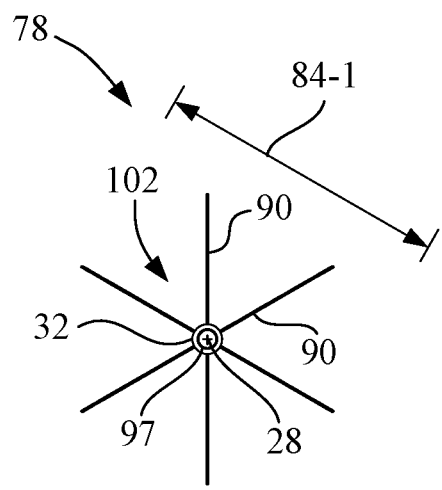
FIG. 4D is a view of the second elongate cannula looking downward in a proximal direction.
Figure 4F:
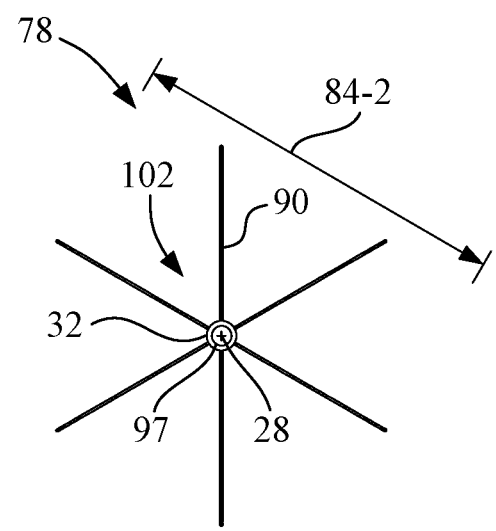
FIG. 4F is a view of the second elongate cannula looking downward in a proximal direction.
Figure 4G:
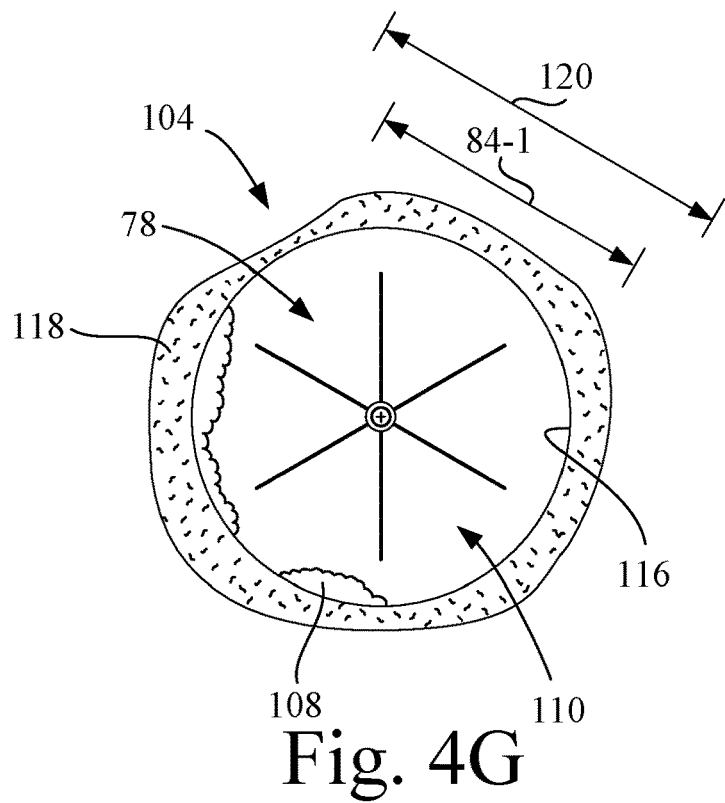
FIG. 4G is a view of the second elongate cannula looking downward in a proximal direction, where second elongate cannula is in vivo at a treatment site.
Figure 4H:
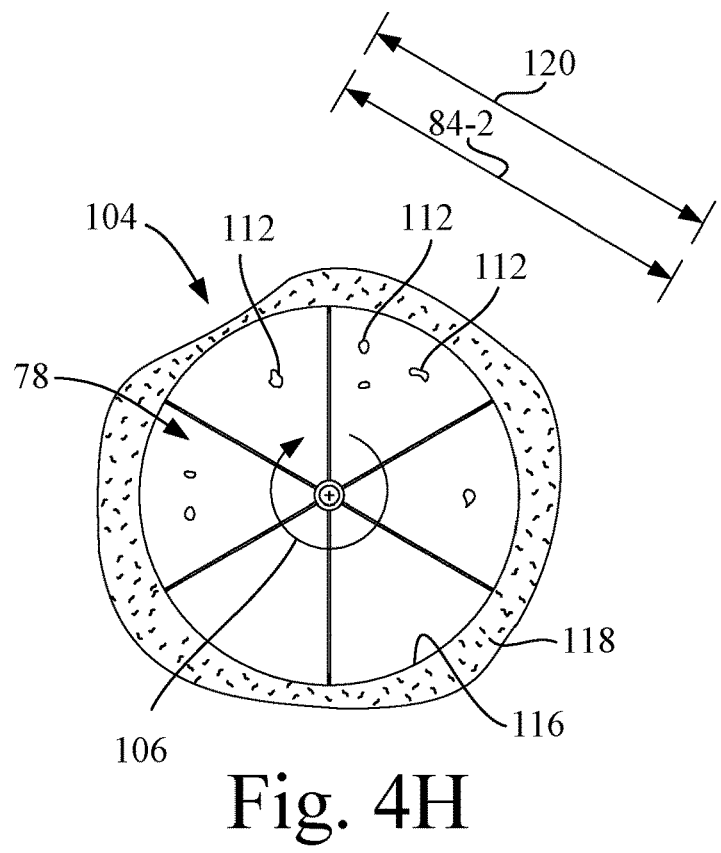
FIG. 4H is a view of the second elongate cannula looking downward in a proximal direction, where second elongate cannula is in vivo at a treatment site.

Mechanical thrombectomy whisk 78 is controllably expandable, that is, the mechanical thrombectomy whisk 78 is configured to expand to a plurality of expanded whisk diameters, including, for example, the first expanded whisk diameter 84-1 shown in FIGS. 4C, 4D, and 4G and the second expanded whisk diameter 84-2, shown in FIGS. 4E, 4F, and 4H, and to retract/collapse back to a closed whisk diameter associated with the closed condition 80. Mechanical thrombectomy whisk 78 has a whisk distal end 86 and a whisk proximal end 88. As mechanical thrombectomy whisk 78 expands the distance between the whisk distal end 86 and the whisk proximal end 88 decreases as shown by comparison of FIG. 4C and FIG. 4E. Conversely, as mechanical thrombectomy whisk 78 contracts or collapses to or toward closed condition 80, the distance between the whisk distal end 86 and whisk proximal end 88 increases, as may be seen by comparing distance D1 in FIG. 1A and distance D2 in FIG. 2B. Mechanical thrombectomy whisk 78 is designed to macerate a thrombus 108 in a venous lumen 110.

As shown in FIG. 4A, mechanical thrombectomy whisk 78 may be constructed of a plurality of wires 90. Each of the plurality of wires has a wire proximal end 92 and a wire distal end 94 and is constructed of a metal alloy, e.g., nitinol or stainless steel. The whisk proximal end 88 is constructed of a plurality of wire proximal ends 92. The whisk distal end 86 is constructed of a plurality of wire distal ends 94. The whisk proximal end 88 is affixed to the second exterior surface 76 via a first collar 96. The plurality of wire distal ends 94 are connected together via a distal collar 98. Each of first collar 96 and distal collar 98 may be a physical collar, an adhesive, a heat seal, or an ultrasonic seal. Distal collar 98 forms the second distal end 72 of the second elongate cannula 32 when mechanical thrombectomy whisk 78 is constructed via a plurality of wires 90.

Optionally, second elongate cannula 32 may include support 97 from at least the first collar 96 to at least the distal collar 98 or only from second proximal end 70 to second distal end 72. When present in second elongate cannula 32, support 97 is the innermost layer of second elongate cannula 32 and functions to provide strength and support to second elongate cannula 32 and the mechanical thrombectomy whisk 78. Support 97 longitudinally extends along the longitudinal axis 28, forms second lumen 74 where present, and may be made from thermoplastic. Support 97 may be affixed to first collar 96 and distal collar 98. Support 97 may extend the full length of second elongate cannula 32.

Mechanical thrombectomy whisk 78 may be manufactured with second elongate cannula 32 or separately and affixed to second elongate cannula 32. Second elongate cannula 32 may be constructed of metal alloy, e.g., stainless steel or nitinol, but is preferably constructed of thermoplastic, e.g., PEBAX®. When the second elongate cannula 32 is constructed of metal alloy, mechanical thrombectomy whisk 78 may be manufactured by producing a plurality of laser cuts through the second exterior surface 76 to second lumen 74. Ideally, each laser cut is parallel to each of the plurality of laser cuts, but the plurality of laser cuts may or may not be parallel to longitudinal axis 28. According to this construction method, the material left behind between the laser cuts form the struts of mechanical thrombectomy whisk 78, as will be understood by persons of ordinary skill in the relevant art.

Optionally, the plurality of laser cuts may be made into a cylinder of a material, e.g., metal alloy, that is directly attached to second elongate cannula 32, which may be made of an alternative material, e.g., thermoplastic. According to this construction method, mechanical thrombectomy whisk 78 would be affixed via bonding adhesive, heat weld, or ultrasonic weld directly to second distal end 72 and whisk distal end 86 would be distal of second distal end 72.

Mechanical thrombectomy whisk 78 is either made from radiopaque materials or has a second marker 100 of radiopaque material added either to mechanical thrombectomy whisk 78 or to the distal region of the second elongate cannula 32. The radiopaque material or second marker 100 is used to track the position and location of the second elongate cannula 32, specifically mechanical thrombectomy whisk 78, under external imaging, such as, e.g., angiography.

Mechanical thrombectomy whisk 78 is designed with a plurality of voids 102. Each void is either a space between the wires or each laser cut. The plurality of voids 102 permit blood and debris 112 to pass through mechanical thrombectomy whisk 78 at a treatment site 104.

Figure 1B:
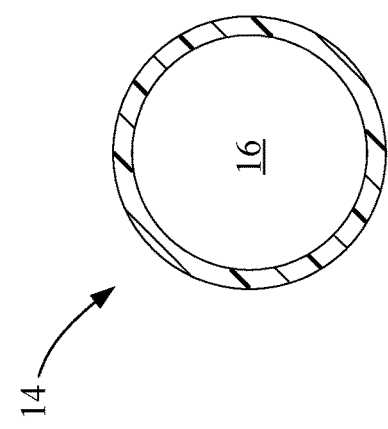
FIG. 1B is a cross-sectional view taken at a transverse cut across the longitudinal axis of the sheath, where the sheath is not assembled with the thrombectomy device in FIG. 1B.

As shown in FIG. 1A and FIG. 2B, mechanical thrombectomy whisk 78 is proximal to distal tip 42. First elongate cannula 30 is disposed in second lumen 74 of second elongate cannula 32, as shown in FIGS. 1-2C. Distal tip 42 of first elongate cannula 30 has a distal tip maximum diameter at a distal tip proximal end 50 that is larger in mathematical diameter than a second elongate cannula diameter 114 taken at the second distal end 72 in order to prevent mechanical thrombectomy whisk 78 from extending in the distal direction 12b past distal tip 42.

As shown in FIG. 4A, second elongate cannula 32 is configured to rotate in a rotational direction 106, such as, clockwise, counter clockwise, or an oscillation between both clockwise and counter clockwise. Mechanical thrombectomy whisk 78 is configured to rotate in order to mechanically break up a thrombus 108 in a venous lumen 110 at the treatment site 104 into debris 112. Medical apparatus 10 may include a proximal manifold (not shown), having a rotation control button or a thumbwheel, each of which may be coupled to a motor, which may or may not be housed within medical apparatus 10, or to a simple mechanical rotation apparatus housed within the proximal manifold.

The plurality of expanded whisk diameters 84-1, 84-2 of mechanical thrombectomy whisk 78 are independently selected via a whisk diameter control button or a whisk diameter slide lever coupled to a simple mechanical device within the proximal manifold of medical apparatus 10, as will be appreciated by a person of ordinary skill in the relevant arts. Whisk diameter control is independent of the rotational speed of second elongate cannula 32. In FIG. 2B, mechanical thrombectomy whisk 78 is shown in the closed condition 80. In the closed condition 80, mechanical thrombectomy whisk 78 has a closed whisk diameter that is substantially equivalent to the second elongate cannula diameter 114, as shown in FIG. 4B. FIG. 4B is an enlargement of the cross-section taken along cross-section lines 4B of FIG. 4A.

Mechanical thrombectomy whisk 78 is configured to be expanded from the closed whisk diameter to the plurality of expanded whisk diameters, such as, for example, a first expanded whisk diameter 84-1 shown in FIGS. 4C-4D and 4G, and a second expanded whisk diameter 84-2 as shown in FIGS. 4E-4F and 4H. As shown in FIG. 4G, first expanded whisk diameter 84-1 does not make contact with interior venous surface 116.

Medical apparatus 10 is configured to control the expansion of mechanical thrombectomy whisk 78 from closed whisk diameter to a plurality of expanded whisk diameters, for example, first expanded whisk diameter 84-1 and second expanded whisk diameter 84-2, and configured to be retracted from each of the plurality of expanded whisk diameters to the closed whisk diameter. Mechanical thrombectomy whisk 78 is configured to be controlled by a slide control in a proximal manifold of medical apparatus 10 that is connected to a plurality of whisk control wires 89. Each of the plurality of whisk control wires 89 is disposed inside a whisk control passageway 91 inside second sidewall 73. FIG. 4B shows a plurality of whisk control passageways 91. Whisk control passageways 91 run parallel through second sidewall 73 to second lumen 74, which is centrally located and configured for first elongate cannula 30 to fit within.

As shown in FIG. 4H, the second expanded whisk diameter 84-2 is larger than the first expanded whisk diameter 84-1 and makes contact with venous sidewall 118. In the example of FIG. 4H, the mathematical diameter of the second expanded whisk diameter 84-2 is the same or substantially the same as the mathematical diameter of the venous lumen diameter 120. When an expanded whisk diameter matches or substantially matches the venous lumen diameter 120, mechanical thrombectomy whisk 78 is operable to destroy or break apart thrombus 108 disposed in venous lumen 110 into debris 112, i.e., smaller particles.

Figures 5A, 5B:
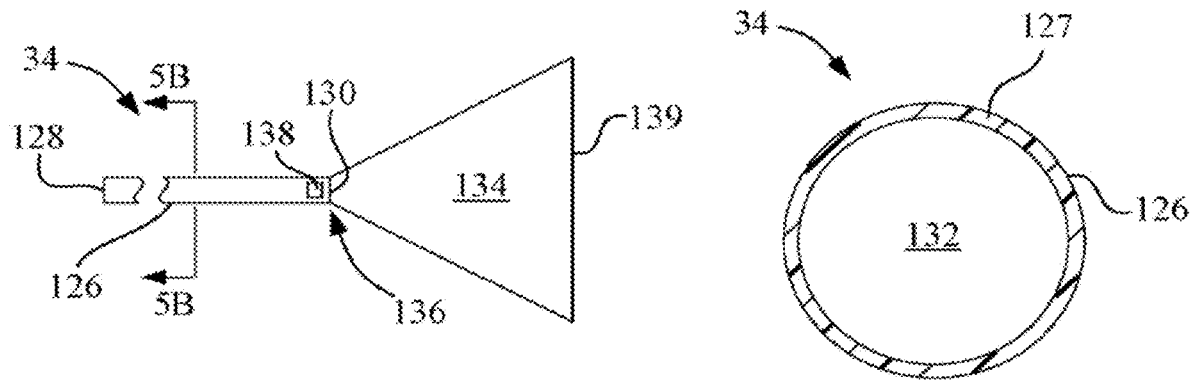
FIG. 5A is a side view of an embodiment of the third elongate cannula of the medical apparatus of FIG. 1A.
FIG. 5B is a cross-sectional view of the third elongate cannula of FIG. 5A taken along cross-sectional line 5B, which is at a transverse angle across the longitudinal axis, where the third elongate cannula is not assembled with the other components of the medical apparatus.

FIGS. 5A-5B show third elongate cannula 34 in an unassembled condition. FIG. 5B is enlarged and not to scale with respect to FIG. 5A or the actual medical apparatus 10. Third elongate cannula 34 has a third exterior surface 126, a third proximal end 128, a third distal end 130, a third lumen 132, and an expandable embolic filter 134 that is connected to the third exterior surface 126 at a filter connection point 136. Third lumen 132 extends longitudinally in parallel to the longitudinal axis 28 in a third sidewall 127, as shown in FIG. 5B. When medical apparatus 10 is fully assembled, second elongate cannula 32 is disposed in third lumen 132 as shown in FIGS. 1A and 2B. Expandable embolic filter 134 is configured to collect debris 112 created by the motion of mechanical thrombectomy whisk 78, whether the motion is rotational, translational, or both. Expandable embolic filter 134 is connected to the third exterior surface 126 at the third distal end 130 of third elongate cannula 34 as shown in FIG. 5A.

Optionally, third elongate cannula 34 includes a third marker 138, which may be a band made of radiopaque material, at the proximal end of expandable embolic filter 134 at the filter connection point 136 on the third exterior surface 126 at the third distal end 130 of third elongate cannula 34. Third marker 138 is used by the medical professionals using medical apparatus 10 to track the location and position of third elongate cannula 34 with respect to thrombus 108 in venous lumen 110 and with respect to the other elements of medical apparatus 10, such as, but not limited to: first marker 56 and second marker 100.

Expandable embolic filter 134, which may be made of perforated mesh, semi-permeable thin material, or a wire frame, is configured to automatically expand once unrestrained. Optionally, second elongate cannula 32, expandable embolic filter 134, or both may be made of nitinol. The expandable embolic filter 134 permits blood flow, but not debris 112 from the destroyed thrombus, to pass through expandable embolic filter 134 at the treatment site 104. Expandable embolic filter 134 has a filter distal end 139.

Figures 6A, 6B:
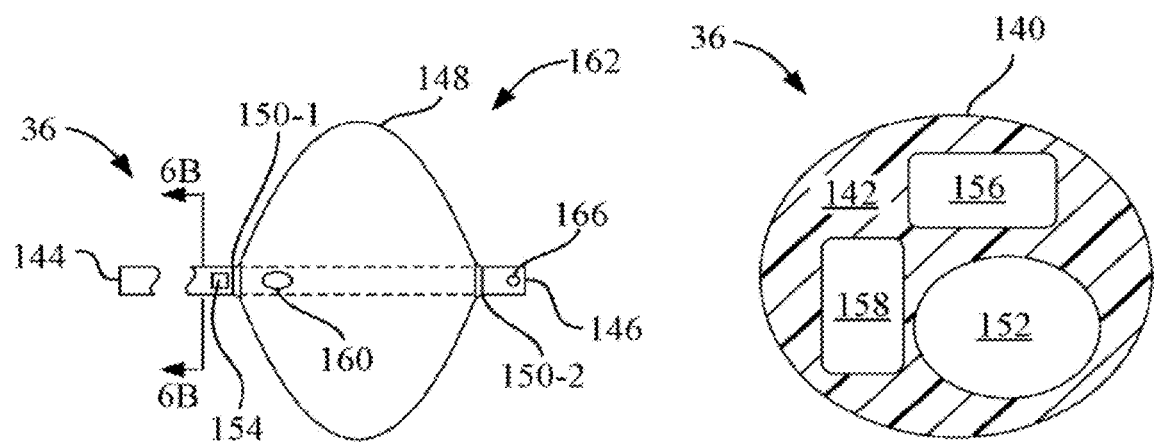
FIG. 6A is a side view of an embodiment of the fourth elongate cannula of the medical apparatus of FIG. 1A.
FIG. 6B is a cross-sectional view of the fourth elongate cannula of FIG. 6A taken along cross-sectional line 5B, which is at a transverse angle across the longitudinal axis, where the fourth elongate cannula is not assembled with the other components of the medical apparatus.

FIGS. 6A and 6B show fourth elongate cannula 36. FIG. 6B is enlarged and not to scale with respect to FIG. 6A or the actual medical apparatus 10. FIGS. 6A and 6B show the fourth elongate cannula in an unassembled condition. Fourth elongate cannula 36 has a fourth exterior surface 140, a fourth sidewall 142, a fourth proximal end 144, a fourth distal end 146, and an inflatable balloon 148 connected to the fourth exterior surface 140 at a proximal balloon connection point 150-1 and a distal balloon connection point 150-2. Proximal balloon connection point 150-1 and distal balloon connection point 150-2 may be an adhesive, a heat weld, or an ultrasonic connection.

Inflatable balloon 148 may be constructed from a thermoplastic elastomer, such as PEBAX®. Fourth elongate cannula 36 has a fourth lumen 152, which is a working lumen. When medical apparatus 10 is fully assembled, third elongate cannula 34 is disposed inside fourth lumen 152, as shown in FIGS. 1, 2A, and 2B. Expandable embolic filter 134 and filter connection point 136 are distal to inflatable balloon 148 and the balloon connection points 150-1, 150-2 as shown in FIGS. 1A and 2B.

When the sheath 14 is in the retracted sheath position 26, the sheath distal end 18 is entirely proximal to inflatable balloon 148, so that inflatable balloon 148 is entirely exposed and able to be inflated to make contact with venous sidewall 118 of venous lumen 110. Optionally, fourth elongate cannula 36 includes a fourth marker 154 made of radiopaque material to track via external imaging the position and location of the fourth elongate cannula 36 with respect to thrombus 108 in venous lumen 110 and with respect to the other radiopaque markers, such as, e.g., first marker 56, second marker 100, and third marker 138.

When inflatable balloon 148 is inflated to have an expanded balloon diameter that makes contact with venous sidewall 118, inflatable balloon 148 blocks or prevents blood flow. The proximal balloon connection point 150-1 and the distal balloon connection point 150-2 are proximal to the filter connection point 136 along longitudinal axis 28, so that expandable embolic filter 134 is distal of inflatable balloon 148 to capture debris 112 in expandable embolic filter 134 as blood flow is restored after deflation of inflatable balloon 148 and just prior to covering thrombectomy device 20 with sheath 14.

Fourth elongate cannula 36 also includes an inflation passageway 156 and, optionally, an aspiration passageway 158, each of which extend longitudinally through the fourth sidewall in parallel with longitudinal axis 28 and the fourth lumen 152. Inflatable balloon 148 is in fluid communication with the inflation passageway 156 via an inflation passageway distal end port 160 that cuts through fourth sidewall 142. Inflation passageway 156 is configured for inflating inflatable balloon 148. Inflatable balloon 148 may be inflated into an inflated condition 162, as shown in FIG. 6A, with an inflation fluid, which may be a liquid or a gas. For instance, the inflation fluid may be saline or a saline and contrast mixture. Medical apparatus 10 is configured to communicate or pump inflation fluid from a medical apparatus proximal end through the inflation passageway 156 and into inflatable balloon 148 and vice versa to deflate the balloon.

When fourth elongate cannula 36 includes aspiration passageway 158, aspiration passageway 158 is in fluid communication with venous lumen 110 via an aspiration passageway distal end port 166. Aspiration passageway 158 is configured to capture debris 112. Aspiration passageway 158 is in fluid communication with a vacuum source, such as, for example, a syringe or a vacuum pump, at an aspiration passageway proximal end port.

Figure 7:
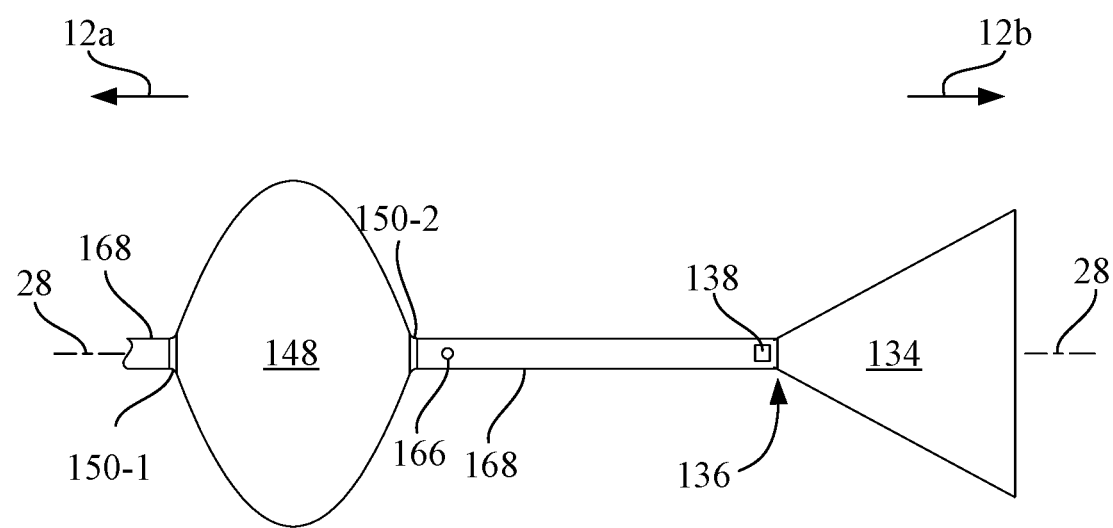
FIG. 7 is a side view of a single elongate cannula, which is an alternative embodiment to the third elongate cannula and the fourth elongate cannula.

Alternatively, according to an aspect of the invention, third elongate cannula 34 and fourth elongate cannula 36 are combined as a single elongate cannula 168, as shown in FIG. 7, to which expandable embolic filter 134 and inflatable balloon 148 are independently connected.

As previously discussed, second elongate cannula 32 is configured to move rotationally, as indicated by rotational direction 106. In some embodiments, second elongate cannula 32 is configured to move only rotationally. However, second elongate cannula 32 may be configured to rotate and to translate along longitudinal axis 28. For example, second elongate cannula 32 is configured to move from an initial second elongate cannula retracted position 170, as exemplified in FIG. 8A, to a plurality of second elongate cannula extended positions, e.g., the position shown in FIG. 8B. Furthermore, second elongate cannula 32 is configured to move from each of the plurality of second elongate cannula extended positions to each of the plurality of second elongate cannula extended positions and back to the initial second elongate cannula retracted position 170. When second elongate cannula 32 is configured to translate along longitudinal axis 28, second elongate cannula 32 is configured to rotate about the central axis, as indicated by rotational direction 106, regardless of the translational position of the second elongate cannula 32.

According to the aspect of the invention depicted in FIGS. 8A-8B, second elongate cannula 32 is configured to translate along longitudinal axis 28 to position mechanical thrombectomy whisk 78 in alignment with thrombus 108. The plurality of second elongate cannula extended positions includes a distal-most second elongate cannula extended position 172, which is shown in FIG. 8B. As demonstrated in FIG. 8B, mechanical thrombectomy whisk 78 is aligned with the perforated region of the first elongate cannula when the second elongate cannula 32 is in the distal-most second elongate cannula extended position 172. However, according to other embodiments, mechanical thrombectomy whisk 78 is proximally adjacent to the perforated region when the second elongate cannula 32 is in the distal-most second elongate cannula extended position 172. According to the aspect of the invention depicted in FIGS. 8A-8B, mechanical thrombectomy whisk 78 is proximally adjacent to the perforated region when the second elongate cannula is in at least one of the plurality of second elongate cannula extended positions. Thus, in at least one of the plurality of second elongate cannula extended positions, mechanical thrombectomy whisk 78 is proximal to the perforated region.

The initial second elongate cannula retracted position, shown in FIG. 8A, is located at a location proximal to each of the plurality of second elongate cannula extended positions. When the second elongate cannula is in the initial second elongate cannula retracted position, mechanical thrombectomy whisk 78 is proximal to the perforated region on the first elongate cannula.

In each of the plurality of second elongate cannula extended positions, mechanical thrombectomy whisk 78 is distal to expandable embolic filter 134. As shown in FIGS. 8A-8B, expandable embolic filter 134 is proximal to mechanical thrombectomy whisk 78 in the initial second elongate cannula retracted position 170 and the plurality of second elongate cannula extended positions.

Regardless of the translational position of second elongate cannula 32 along longitudinal axis 28, mechanical thrombectomy whisk 78 is configured to expand or contract at the selection of the operator in order to size the mechanical thrombectomy whisk 78 to approximately the same mathematical diameter of venous lumen 110 to macerate thrombus 108.

Figure 9A:
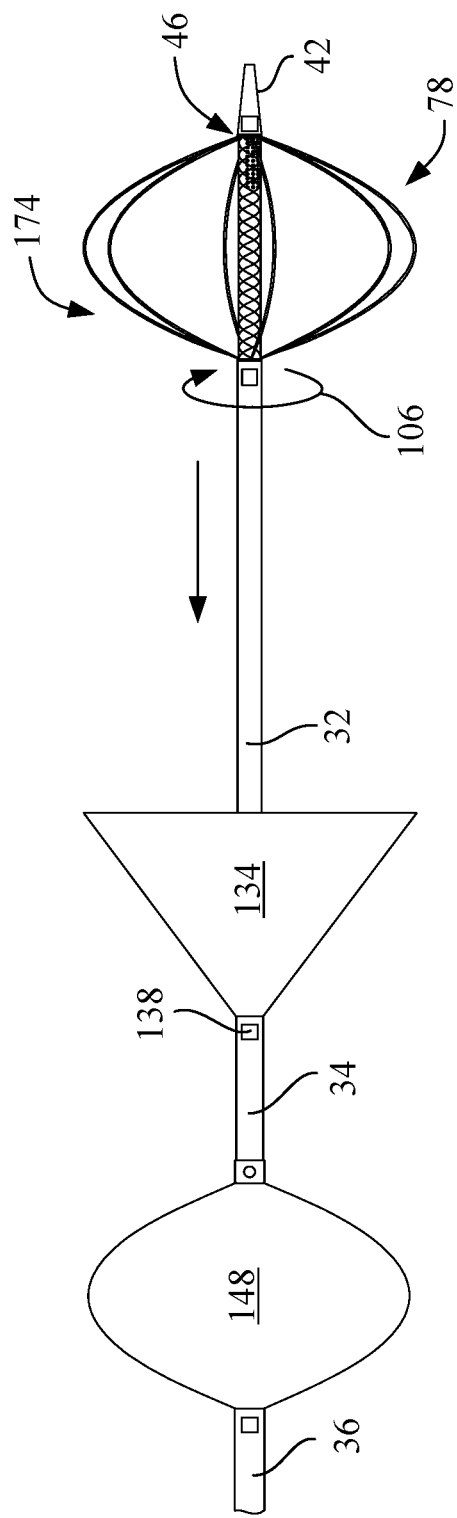
FIG. 9A is a side view of the medical apparatus of FIG. 1A, according to an aspect of the present invention, the second elongate cannula is in the initial second elongate cannula extended position.
Figure 9B:
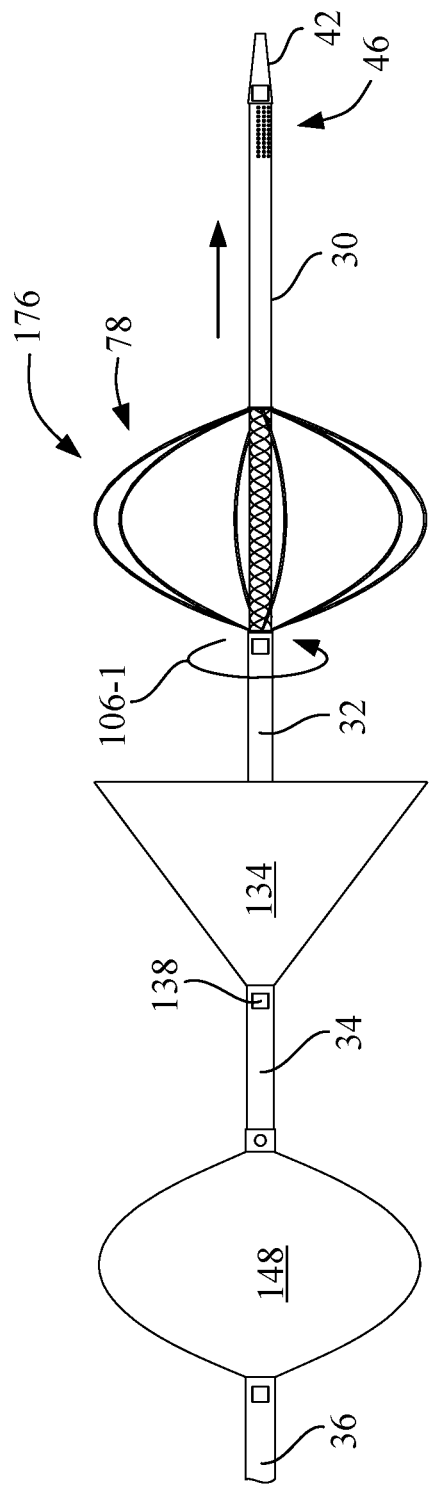
FIG. 9B is a side view of the medical apparatus of FIG. 1A, according to an aspect of the present invention, the second elongate cannula is in a second elongate cannula retracted position.

Alternatively, medical apparatus 10 and second elongate cannula 32 are arranged as shown in FIGS. 9A-9B, which is opposite to the configuration of FIGS. 8A-8B. In the configuration of FIGS. 9A-9B, second elongate cannula 32 is configured to rotate and to translate, but instead of translating from initial second elongate cannula retraction position 170 to a plurality of second elongate cannula extended positions, second elongate cannula 32 begins in an initial second elongate cannula extended position 174, as shown in FIG. 9A, and is configured to move to a plurality of second elongate cannula retracted positions, e.g., the second elongate cannula retracted position 176 shown in FIG. 9B. Second elongate cannula 32 is configured to move from each of the plurality of second elongate cannula retracted positions to each of the plurality of second elongate cannula retracted positions. Second elongate cannula 32 is configured to move from each of the plurality of second elongate cannula retracted positions to the initial second elongate cannula extended position 174. The initial second elongate cannula extended position 174 is located at a location distal to each of the plurality of second elongate cannula retracted positions.

According to another aspect of medical apparatus 10 of FIG. 1A, using third elongate cannula 34 of FIG. 5A, the third elongate cannula 34 is configured to be movable from an initial third elongate cannula extended position 178, which is best seen in FIG. 10A, to a third elongate cannula retracted position 180, such as, the position of third elongate cannula 34 in FIG. 10C. As described above, it is optional for third elongate cannula 34 and fourth elongate cannula 36 be replaced with single elongate cannula 168, and single elongate cannula 168 may be configured to be movable from initial third elongate cannula extended position 178 to third elongate cannula retracted position 180 to expose second elongate cannula 32 and mechanical thrombectomy whisk 78 following a sequence similar to the sequence of FIGS. 10A-10C.

As shown in FIG. 10A, when sheath 14 entirely covers thrombectomy device 20 in the initial extended sheath position 24 and third elongate cannula 34 is in the initial third elongate cannula extended position 178, expandable embolic filter 134 is aligned with and overlaps over mechanical thrombectomy whisk 78. Mechanical thrombectomy whisk 78 is in closed condition 80 and has the closed whisk diameter when third elongate cannula 34 is in the initial third elongate cannula extended position 178, because mechanical thrombectomy whisk 78 is entirely contained within sheath lumen 16. FIG. 10A shows sheath 14 as cut-away to better illustrate the thrombectomy device 20 that is contained within sheath lumen 16 when sheathed inside sheath 14.

FIG. 10B shows third elongate cannula 34 in the initial third elongate cannula extended position 178 and sheath 14 partially retracted so that expandable embolic filter 134 has automatically opened or expanded. Of course, there are an infinite number of intermediate positions of partially retracted positions between the initial third elongate cannula extended position 178 of FIG. 10A and the third elongate cannula retracted position 180, such as, e.g., the position shown in FIG. 10C.

When third elongate cannula 34 is in the third elongate cannula retracted position 180, as shown FIG. 10C, a filter distal end 139 is proximal to mechanical thrombectomy whisk 78. According to the aspect of the invention of third elongate cannula 34 being configured to be movable from the initial third elongate cannula extended position 178 to the third elongate cannula retracted position 180, mechanical thrombectomy whisk 78 must be exposed when sheath 14 is in retracted sheath position 26 and third elongate cannula 34 is in the third elongate cannula retracted position 180. Thus, when medical apparatus 10 is in operation inside a patient, mechanical thrombectomy whisk 78 is exposed to venous lumen 110 when third elongate cannula 34 is in the third elongate cannula retracted position 180 and sheath 14 is in the retracted sheath position 26, as shown in FIG. 10C.

Figure 11A:
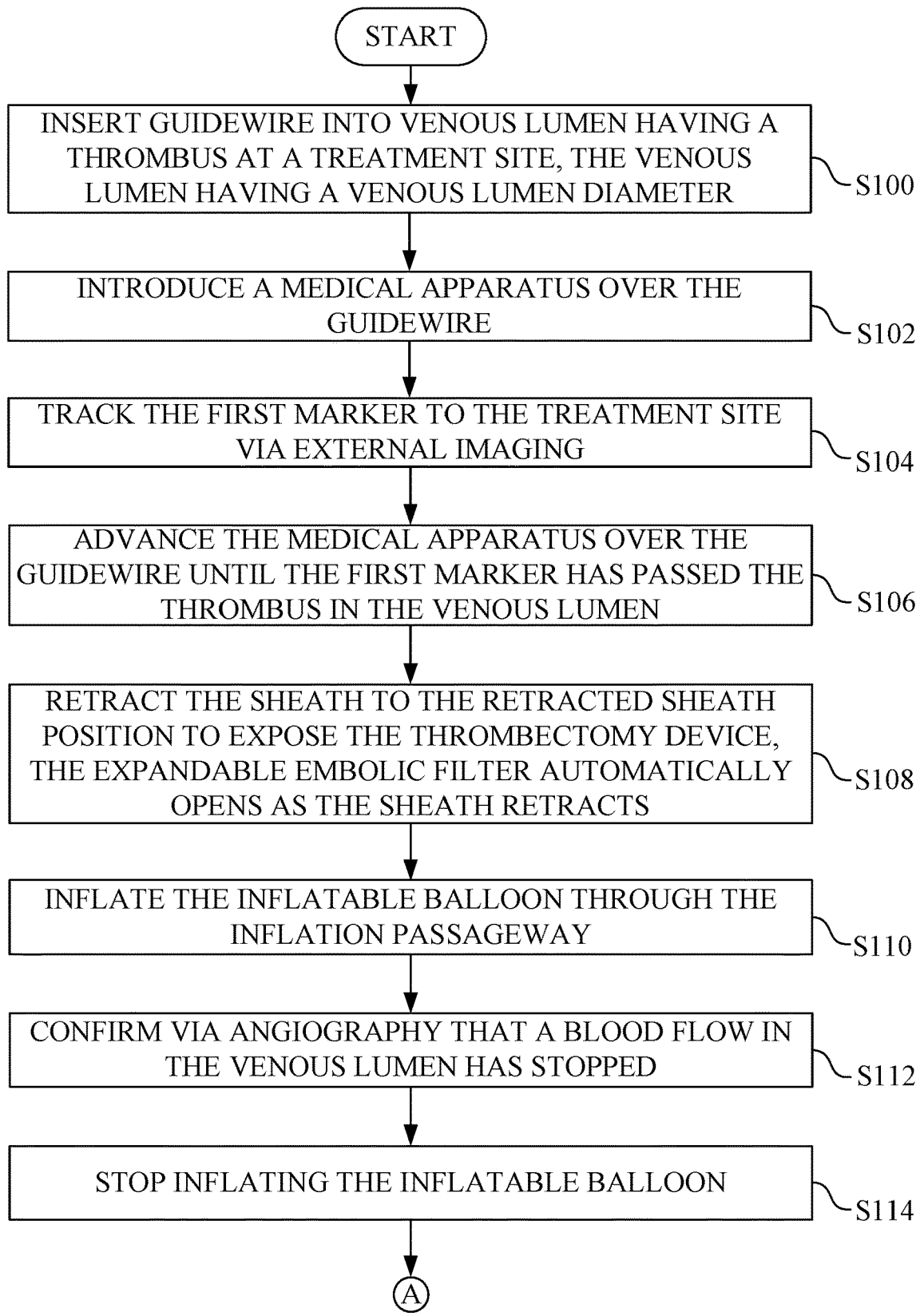
FIG. 11A-11B is a flowchart of a method according to an aspect of the present invention.
Figure 11B:
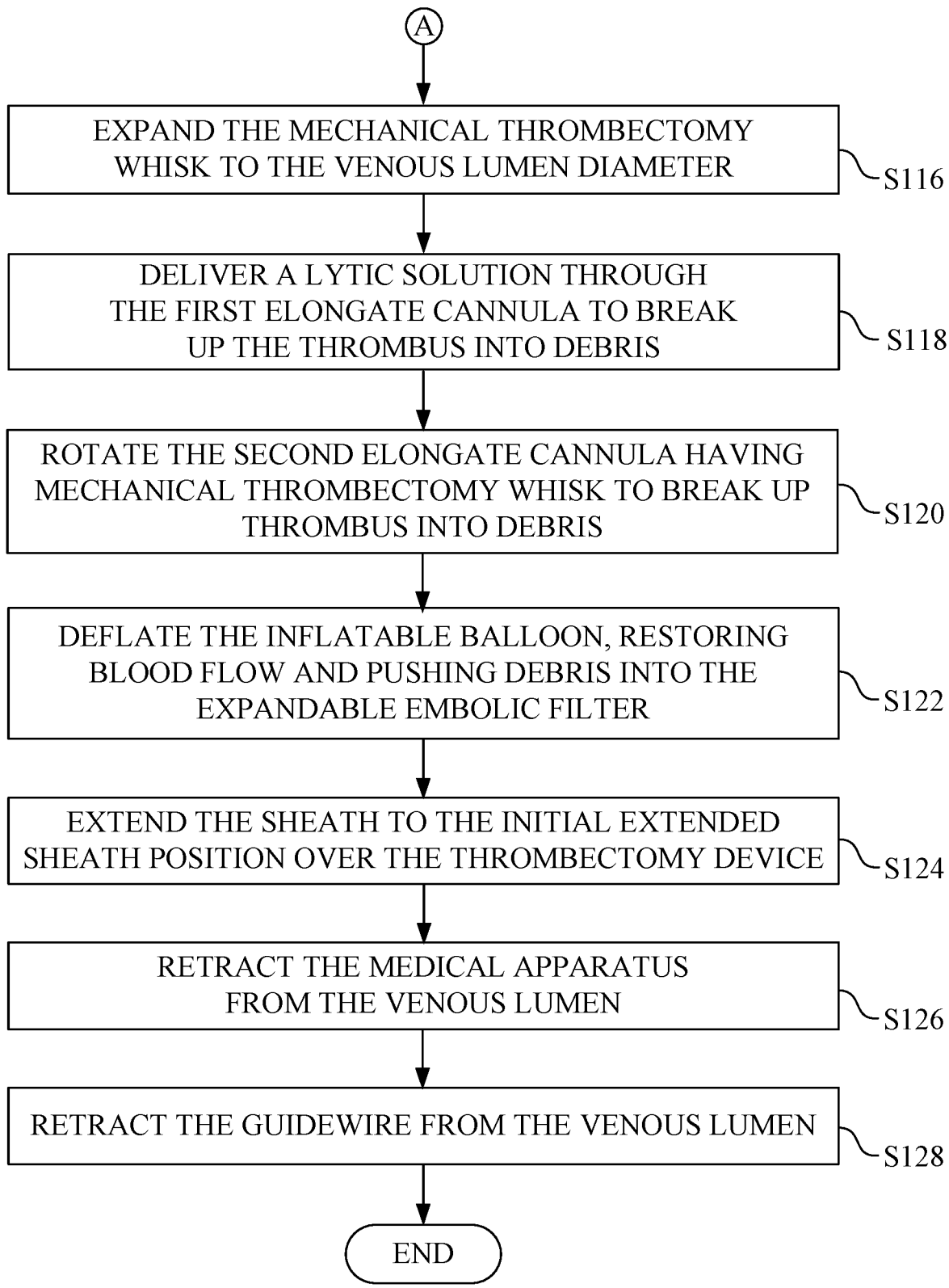

FIGS. 11A-11B is a continuous flowchart of an exemplary method according to an aspect of the present invention, suitable for use with medical apparatus 10 depicted in FIG. 1A for treating a thrombus in a patient. Thus, the method of FIGS. 11A-11B will be described with reference to FIGS. 1A-10C.

At step S100, at the outset of the procedure, guidewire 22 is inserted into venous lumen 110 against the direction of blood flow. Venous lumen 110 has thrombus 108 at a treatment site 104. Venous lumen 110 has venous lumen diameter 120.

At step S102, the medical apparatus of FIG. 1A, having replaced third elongate cannula 34 of FIG. 5A and the fourth elongate cannula of FIG. 6A with the single elongate cannula 168 of FIG. 7 that has inflatable balloon 148 and expandable embolic filter 134 mounted to single elongate cannula 168 as shown in FIG. 7, is introduced over guidewire 22. Medical apparatus 10 used in the exemplary method of FIG. 11 includes first marker 56, which is a radiopaque marker, located at or on distal tip 42. Furthermore, first marker 56 may be distal tip 42 itself.

At step S104, first marker 56 is tracked via an external imaging system, such as, e.g., angiography, as medical apparatus 10 is advanced over guidewire 22 to treatment site 104.

At step S106, using an external imaging system, medical apparatus 10 is advanced over guidewire 22 until first marker 56 has passed thrombus 108 in venous lumen 110.

At step S108, sheath 14 is retracted to retracted sheath position 26 to expose thrombectomy device 20, and expandable embolic filter 134 automatically opens as sheath 14 retracts proximally past expandable embolic filter 134.

At step S110, inflatable balloon 148 is inflated via delivery of an inflation fluid through inflation passageway 156 to inflatable balloon 148.

At step S112, under the external imaging system, such as, e.g., angiography, blood flow is confirmed to have stopped in venous lumen 110.

At step S114, the delivery of the inflation fluid to inflatable balloon 148 is stopped.

At step S116, mechanical thrombectomy whisk 78 is expanded so that the diameter of mechanical thrombectomy whisk 78, such as second expanded whisk diameter 84-2, is the same or substantially the same as the venous lumen diameter 120.

At step S118, a lytic therapeutic solution is delivered through first elongate cannula 30 to break up thrombus 108 into debris 112.

At step S120, second elongate cannula 32, having mechanical thrombectomy whisk 78, is rotated to break up thrombus 108 into debris 112.

At step S122, inflatable balloon 148 is deflated via inflation passageway distal end port 160, which cuts through fourth sidewall 142 inside inflatable balloon 148 as shown in FIG. 6A. As an automatic and natural result of inflatable balloon 148 being deflated, blood flow is restored and debris 112, if any is present, is pushed into expandable embolic filter 134.

At step S124, sheath 14 is extended to initial extended sheath position 24, which is over thrombectomy device 20. As sheath 14 covers thrombectomy device 20, mechanical thrombectomy whisk 78 and expandable embolic filter 134 automatically collapse, trapping any debris 112 collected in expandable embolic filter 134 inside expandable embolic filter 134. Furthermore, if any debris 112 is outside of expandable embolic filter 134, debris 112 will be captured under sheath 14 as sheath 14 is extended to initial extended sheath position 24.

At step S126, medical apparatus 10 is retracted over guidewire 22 and out of venous lumen 110. At the conclusion of step S126, the method may conclude by leaving guidewire 22 in place for a subsequent procedure or external imaging.

Alternatively, the method moves to step S128, and guidewire 22 is retracted from venous lumen 110, concluding the method.

Optionally, according the exemplary method of FIGS. 11A-11B, the operator has some choices to make after step S116. The operator may choose to perform a lysis procedure by moving directly to step S118 to deliver a lytic therapeutic solution through first elongate cannula 30 to break up thrombus 108 into debris 112. The operator may choose to then proceed with a thrombectomy procedure, moving to step S120, where second elongate cannula 32, having mechanical thrombectomy whisk 78, may be translated longitudinally to be in alignment with thrombus 108 and then rotated to break up thrombus 108 into debris 112. Step S118 and step S120 may be taken in any order (S120 before S118 or vice versa) and may be conducted independently or simultaneously. Furthermore, an operator may choose to take step S118, but not step S120, or the operator may choose to take step S120, but not step S118.

Optionally, the method may include the following described steps (not shown in FIGS. 11A-11B) just prior to step S120: second marker 100 is tracked within the venous lumen; and second elongate cannula 32 is translated until the second marker 100 is aligned with thrombus 108.

Optionally, prior to or immediately after step S122, if the medical apparatus 10 includes aspiration passageway 158, the operator may elect to aspirate debris 112 in venous lumen 110 through aspiration passageway distal end port 166 to aspiration passageway 158.

Advantageously, the described method of FIGS. 11A-11B and the optional additional steps described above, provide for a clean and simple procedure that speeds up thrombectomy and lysis procedures, which reduces financial expenses associated with longer procedures. The condensed procedural time reduces health risks to the patient. Also, because medical apparatus 10 is designed to perform a lysis procedure and a thrombectomy procedure to treat post thrombus syndrome, medical apparatus 10 (and the described variations of medical apparatus 10) eliminates the need for a number of additional, separate tools, which keeps costs down and reduces patients' health risks associated with insertion and retrieval of multiple medical tools.

As used herein the terms "substantially", "generally", "slightly", and other words of degree are relative modifiers intended to indicate permissible variation from the characteristic so modified. Such terms are not intended to be limited to the absolute value of the characteristic which it modifies, but rather possessing more of the physical or functional characteristic than the opposite, and approaching or approximating such a physical or functional characteristic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A medical apparatus, comprising:
a sheath having a sheath distal end and a sheath lumen, the sheath movable between an initial extended sheath position and a retracted sheath position; and
a thrombectomy device, the thrombectomy device disposed in the sheath lumen, the thrombectomy device including:
a first elongate cannula having a proximal end, a distal end having a distal tip, a guidewire lumen, and a perforated region, the perforated region having a plurality of perforations in fluid communication with the guidewire lumen, the perforated region proximal to the distal tip;
a second elongate cannula having a second proximal end, a second distal end, a second lumen, and a mechanical thrombectomy whisk, the first elongate cannula disposed in the second lumen, the mechanical thrombectomy whisk proximal to the distal tip, the second elongate cannula configured to rotate;

a third elongate cannula having a third exterior surface, a third proximal end, a third distal end, a third lumen, and an expandable embolic filter connected to the third exterior surface, the second elongate cannula disposed in the third lumen; and a fourth elongate cannula having a fourth exterior surface, a fourth proximal end, a fourth distal end, a fourth lumen, an inflation passageway, and an inflatable balloon connected to the fourth exterior surface, the third elongate cannula disposed in the fourth lumen, the inflatable balloon in fluid communication with the inflation passageway, wherein the expandable embolic filter has a filter distalmost edge, and the third distal end of the third elongate cannula terminates proximally of the filter distalmost edge at least when the sheath is in the initial extended sheath position, such that the expandable embolic filter at least partially covers the mechanical thrombectomy whisk.

2. The medical apparatus of claim 1, wherein in the retracted sheath position, the sheath distal end is entirely proximal to the inflatable balloon.

3. The medical apparatus of claim 1, wherein the second elongate cannula is configured to move from an initial second elongate extended position to a plurality of second elongate cannula retracted positions, in at least one of the plurality of second elongate retracted positions the mechanical thrombectomy whisk is proximally adjacent to the perforated region.

4. The medical apparatus of claim 1, wherein the second elongate cannula is configured to move from an initial second elongate cannula retracted position to a plurality of second elongate cannula extended positions, the second elongate cannula is configured to move to at least one of the plurality of second elongate cannula extended positions to position the mechanical thrombectomy whisk in alignment with a thrombus in a vessel.

5. The medical apparatus of claim 4, wherein the plurality of second elongate cannula extended positions includes a distal-most second elongate cannula extended position, the mechanical thrombectomy whisk is aligned with the perforated region when the second elongate cannula is in the distal-most second elongate cannula extended position.

6. The medical apparatus of claim 4, wherein the mechanical thrombectomy whisk is proximally adjacent to the perforated region when the second elongate cannula is in at least one of the plurality of second elongate cannula extended positions.

7. The medical apparatus of claim 1, wherein the third elongate cannula is configured to move from an initial third elongate cannula extended position to a third elongate cannula retracted position, the third elongate cannula retracted position proximal to the initial third elongate cannula extended position, when the sheath is in the retracted sheath position and the third elongate cannula is in the third elongate cannula retracted position the mechanical thrombectomy whisk is exposed.

8. The medical apparatus of claim 1, wherein the inflation passageway is formed within the fourth elongate cannula and is disposed adjacent to the fourth lumen.

9. The medical apparatus of claim 1, wherein the perforated portion region is adjacent the distal tip and is advanceable distal to the inflatable balloon.

10. The medical apparatus of claim 8, wherein the fourth elongate cannula further comprises an aspiration passageway disposed adjacent to the inflation passageway and the fourth lumen.

11. The medical apparatus of claim 1, wherein the perforated region is configured to deliver a therapeutic solution to a treatment site.

12. The medical apparatus of claim 11, wherein the therapeutic solution is delivered to the perforated region through the guidewire lumen.

* * * * *